(12) United States Patent
Fai (10) Patent No.: US 9,268,681 B2
(45) Date of Patent: Feb. 23, 2016

(54) HETEROGENEOUS DATA PATHS FOR SYSTEMS HAVING TIERED MEMORIES

(75) Inventor: Anthony Fai, Palo Alto, CA (US)

(73) Assignee: APPLE INC., Cupertino, CA (US)

( * ) Notice: Subject to any disclaimer, the term of this patent is extended or adjusted under 35 U.S.C. 154(b) by 75 days.

(21) Appl. No.: 13/599,302

(22) Filed: Aug. 30, 2012

(65) Prior Publication Data

US 2014/0068144 A1  Mar. 6, 2014

(51) Int. Cl.
*G06F 12/00* (2006.01)
*G06F 13/00* (2006.01)
*G06F 13/28* (2006.01)
*G06F 12/02* (2006.01)
*G06F 3/06* (2006.01)

(52) U.S. Cl.
CPC .......... *G06F 12/0246* (2013.01); *G06F 3/0619* (2013.01); *G06F 3/0656* (2013.01); *G06F 3/0685* (2013.01); *G06F 2212/1024* (2013.01); *G06F 2212/1044* (2013.01); *G06F 2212/7202* (2013.01); *G06F 2212/7203* (2013.01)

(58) Field of Classification Search
CPC ............ G06F 12/0866; G06F 12/0868; G06F 12/0246; G06F 2212/7202; G06F 2212/7203; G06F 2212/1044; G06F 2212/1024; G06F 3/0619; G06F 3/0656; G06F 3/0685
USPC .......... 711/103, 112, 122, E12.008, E12.001, 711/105.102, 115
See application file for complete search history.

(56) References Cited

U.S. PATENT DOCUMENTS

| | | | |
|---|---|---|---|
| 7,139,213 B2 | 11/2006 | Rao | |
| 7,423,918 B2 | 9/2008 | Royer | |
| 2005/0251617 A1* | 11/2005 | Sinclair et al. | ................. 711/103 |
| 2010/0241770 A1* | 9/2010 | Tumblin et al. | .................. 710/52 |
| 2012/0297117 A1* | 11/2012 | Jo et al. | ......................... 711/103 |

* cited by examiner

*Primary Examiner* — Sanjiv Shah
*Assistant Examiner* — Shane Woolwine
(74) *Attorney, Agent, or Firm* — Van Court & Aldridge LLP (57) ABSTRACT

A nonvolatile memory ("NVM") buffer is incorporated into an NVM system between a volatile memory buffer and an NVM to decrease the size of the volatile memory buffer and organize data for programming to the NVM. Heterogeneous data paths may be are used for write and read operations such that the nonvolatile memory buffer is used only in certain situations.

11 Claims, 5 Drawing Sheets

HETEROGENEOUS DATA PATHS FOR SYSTEMS HAVING TIERED MEMORIES

BACKGROUND OF THE DISCLOSURE

Various types of nonvolatile memory ("NVM"), such as flash memory (e.g., NAND flash memory and NOR flash memory), can be used for mass storage. For example, consumer electronics (e.g., portable media players) use flash memory to store data, including music, videos, images, and other media or types of information.

NVM systems can incorporate a volatile memory buffer (e.g., a dynamic random access memory ("DRAM") buffer) for receiving data before it is programmed to the NVM. Because volatile memory is typically faster than NVM, such a volatile memory buffer can improve NVM system latency. While system latency characteristics can generally improve with larger volatile memory buffers because more data can be transferred directly to the faster nonvolatile memory, this improved latency comes with a risk of data loss because volatile memory does not retain information upon interruption of power. Thus, the larger the volatile memory buffer used, the higher the risk of catastrophic data loss before the data is transferred from the volatile memory buffer to the NVM.

SUMMARY OF THE DISCLOSURE

Heterogeneous data paths for systems using tiered memories are disclosed. A nonvolatile memory buffer can be incorporated into an NVM system between a volatile memory buffer and the NVM. The nonvolatile memory buffer may be used to decrease the size of the volatile memory buffer and organize data for programming to the NVM. This approach can result in reduced risk of catastrophic data loss and better NVM block utilization while preserving the latency benefits provided by the volatile memory buffer. Heterogeneous data paths may be used for write and read operations such that data is stored in the nonvolatile memory buffer only during write operations.

BRIEF DESCRIPTION OF THE DRAWINGS

The above and other aspects of the invention, its nature, and various features will become more apparent upon consideration of the following detailed description, taken in conjunction with the accompanying drawings, in which like reference characters refer to like parts throughout, and in which.

DETAILED DESCRIPTION OF THE DISCLOSURE

Systems and methods for heterogeneous data paths for a system having tiered memories are disclosed. As used herein, "heterogeneous data paths" can refer to different data paths for writing data to and reading data from an NVM. "Tiered memories" can refer to a series of one or more different types of memories (e.g., persistent and non-persistent).

In some embodiments, a data path for writing data to an NVM from, for example, a host device can include storing data in a volatile memory buffer, transferring the data from the volatile memory buffer to a nonvolatile memory buffer, and then transferring the data from the nonvolatile memory buffer to the NVM. Using a nonvolatile memory buffer in addition to a volatile memory buffer in the write data path can allow for smaller volatile memory to be used while maintaining similar latency reduction as compared to a system with no memory buffers. In addition, the nonvolatile memory buffer can reduce the risk of catastrophic data loss that can occur if system power is lost while data resides in the volatile memory buffer.

Further, data stored in an NVM buffer can be reorganized before it is programmed to the NVM. Reorganization of data before programming can optimize block utilization in the NVM, leading to a reduced need for data management techniques such as garbage collection. Additionally, organization of data in the NVM buffer may result in fewer program/erase cycles, which can prolong the useful life of the NVM.

In some embodiments, a data path for reading data from an NVM can include transferring the data from the NVM directly to the volatile memory buffer and then transferring the data from the volatile memory buffer to, for example, a host device. Because the data being read from the NVM remains on the NVM after the read operation, there is no risk of data loss if system power is lost while the read data resides in the volatile memory buffer. Thus, the data can be transferred directly from the NVM to the volatile memory buffer and then to the host device without being stored in a nonvolatile memory buffer.

Figure 1:
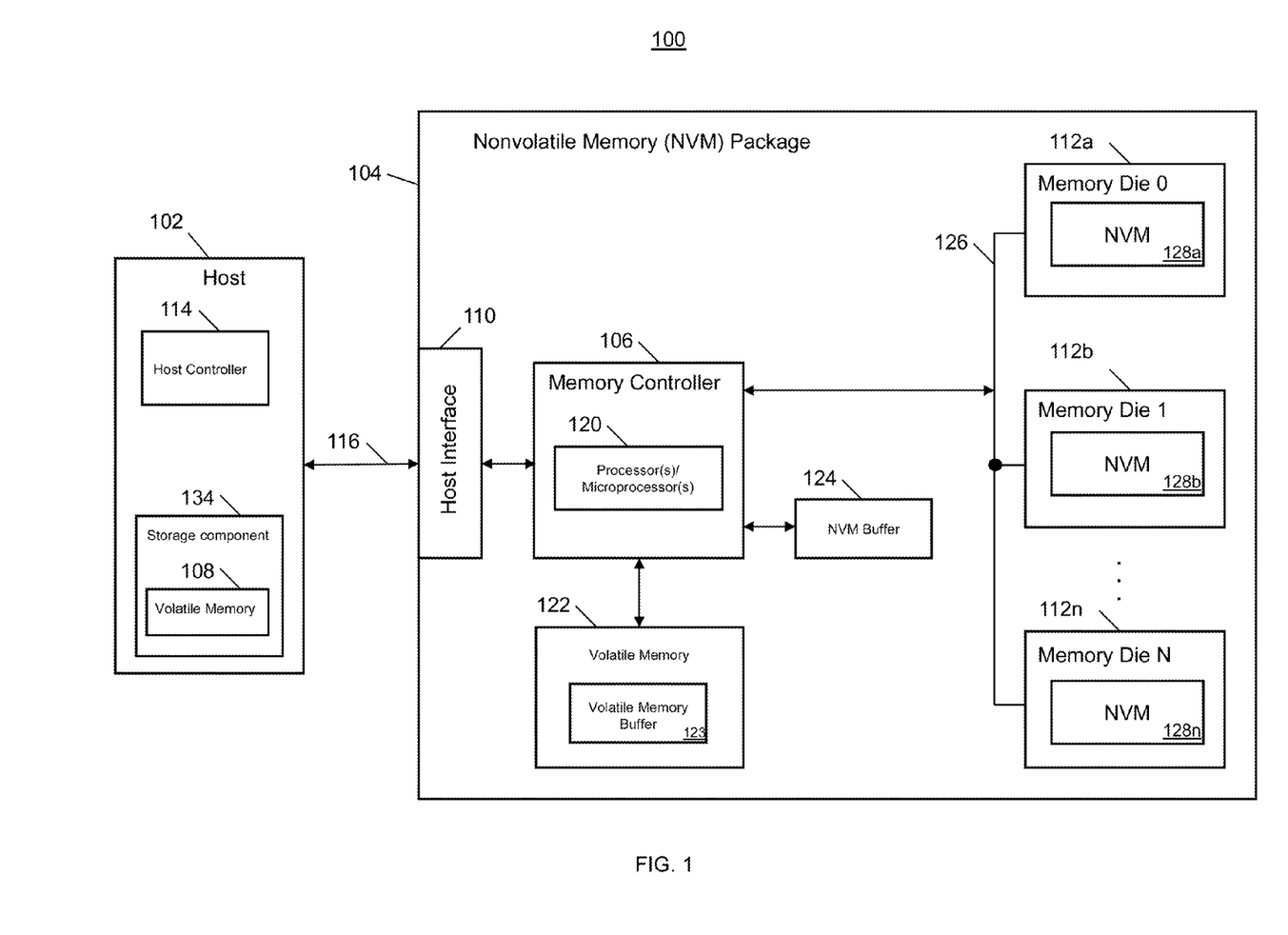
FIG. 1 is a diagram depicting an illustrative system that includes a host and an NVM package with a memory controller in accordance with various embodiments.

FIG. 1 is a diagram depicting system 100, including NVM package 104 and host 102. Host 102 may be configured to provide memory access requests (e.g., read, program, and erase commands) to NVM package 104, which can include memory controller 106, host interface 110, and NVM dies 112a-n with corresponding NVMs 128a-n.

Host 102 can be any of a variety of host devices and/or systems, such as a portable media player, a cellular telephone, a pocket-sized personal computer, a personal digital assistant ("PDA"), a desktop computer, a laptop computer, and/or a tablet computing device. NVM package 104 can include NVMs 128a-n (e.g., in NVM dies 112a-n) and can be a ball grid array package or other suitable type of integrated circuit ("IC") package. NVM package 104 can be part of and/or separate from host 102. For example, host 102 can be a board-level device and NVM package 104 can be a memory subsystem that is installed on the board-level device. In other embodiments, NVM package 104 can be coupled to host 102 with a wired (e.g., SATA) or wireless (e.g., Bluetooth™) interface.

Host 102 can include host controller 114 that is configured to interact with NVM package 104. For example, host 102 can transmit various access requests, such as read, program, and erase requests, to NVM package 104. Host controller 114 can include one or more processors and/or microprocessors that are configured to perform operations based on the execution of software and/or firmware instructions. Additionally or alternatively, host controller 114 can include hardware-based components, such as application-specific integrated circuits ("ASICs"), that are configured to perform various operations. Host controller 114 can format information (e.g., commands and/or data) transmitted to NVM package 104 according to a communications protocol shared between host 102 and NVM package 104.

Host 102 can include volatile memory 108. Volatile memory 108 can be any of a variety of volatile memory types, such as cache memory or RAM. Host 102 can use volatile memory 108 to perform memory operations and/or to temporarily store data that is being read from and/or written to NVM package 104. For example, volatile memory 108 can temporarily store a set of access requests to be sent to, or to store data received from, NVM package 104.

Host 102 can communicate with NVM package 104 over communications channel 116 using host interface 110 and memory controller 106. Communications channel 116 can be any bus suitable for bidirectional communications. Communications channel 116 can be fixed, detachable, or wireless. Communications channel 116 can be, for example, a universal serial bus ("USB"), serial advanced technology ("SATA") bus, or any other suitable bus.

Memory controller 106 can include one or more processors and/or microprocessors 120 that are configured to perform operations based on the execution of software and/or firmware instructions. Additionally or alternatively, memory controller 106 can include hardware-based components, such as ASICs, that are configured to perform various operations. Memory controller 106 can perform a variety of operations, such as dispatching commands issued by host 102.

Host controller 114 and memory controller 106, alone or in combination, can perform various memory management functions, such as garbage collection and wear leveling. In implementations where memory controller 106 is configured to perform at least some memory management functions, NVM package 104 can be termed "managed NVM" (or "managed NAND" for NAND flash memory). This can be in contrast to "raw NVM" (or "raw NAND" for NAND flash memory), in which host controller 114, external to NVM package 104, performs memory management functions for NVM package 104.

As depicted in FIG. 1, memory controller 106 can be incorporated into the same package as NVM dies 112a-n. In other embodiments, memory controller 106 may be physically located in a separate package or in the same package as host 102. In some embodiments, memory controller 106 may be omitted, and all memory management functions that are normally performed by memory controller 106 (e.g., garbage collection and wear leveling) can be performed by a host controller (e.g., host controller 114).

NVMs 128a-n can be any of a variety of NVM, such as NAND flash memory based on floating gate or charge trapping technology, NOR flash memory, erasable programmable read only memory ("EPROM"), electrically erasable programmable read only memory ("EEPROM"), ferroelectric RAM ("FRAM"), magnetoresistive RAM ("MRAM"), phase change memory ("PCM"), or any combination thereof. NVMs 128a-n can be organized into "blocks", which can the smallest erasable unit, and further organized into "pages", which can be the smallest unit that can be programmed or read. In some embodiments, NVMs 128a-n can include multiple integrated circuits, where each integrated circuit may have multiple blocks. Memory locations (e.g., blocks or pages of blocks) from corresponding integrated circuits may form "super blocks". Each memory location (e.g., page or block) of NVMs 128a-n can be referenced using a physical address (e.g., a physical page address or physical block address).

NVM package 104 may include volatile memory 122. Volatile memory 122 can be any of a variety of volatile memory types, such as cache memory or any suitable type of random-access memory ("RAM") (e.g., dynamic RAM ("DRAM")). Volatile memory 122 can store firmware and memory controller 106 can use the firmware to perform operations on NVM package 104 (e.g., read/program operations). In some embodiments, volatile memory 122 can be included within memory controller 106.

Volatile memory 122 may include a volatile memory buffer 123. Memory controller 106 can use volatile memory buffer 123 to perform access requests and/or to temporarily store data that is being read from and/or written to NVMs 128a-n in NVM dies 112a-n. For example, to improve latency, data that is to be programmed to or read from NVMs 128a-n may be stored temporarily in volatile memory buffer 123. Using volatile memory buffer 123 to temporarily store data may reduce latency because it may generally be faster to read from and write to volatile memory than NVM.

NVM package 104 may also include an NVM buffer 124. NVM buffer 124 can be any of a variety of nonvolatile memory types, such as magnetoresistive random-access memory ("MRAM"), phase change memory ("PCM"), resistive random-access memory ("ReRAM"), or any other suitable type of persistent random-access memory. For example, NVM buffer 124 can be a nonvolatile byte addressable memory. Data that is to be programmed to NVMs 128a-n may be transferred, for example, from volatile memory buffer 123 to NVM buffer 124 prior to being stored in NVMs 128a-n.

The inclusion of NVM buffer 124 in a write-operation path can reduce the risk of catastrophic data loss in the event that power to system 100 is lost while data resides in volatile memory buffer 123 because the size of volatile memory buffer 123 may be reduced. That is, a smaller volatile memory buffer will lose less data than a large volatile memory buffer in the event that power to system 100 is lost. NVM buffer 124 offers persistent storage of data before the data can be committed to the NVM, thereby preventing data loss. Moreover, by using NVM buffer 124, the same or similar latency benefits can still be achieved. Latency reduction may be maintained because a user of system 100 experiences write operations as if the data is being written to volatile memory buffer 123 rather than to the relatively slower NVMs 128a-n.

In some embodiments, NVM buffer 124 may be used as a "smart buffer" to reorganize data before it is programmed to NVMs 128a-n. For example, NVM buffer 124 may be filled with data received from volatile memory buffer 123 in increments equal to the block size used in NVMs 128a-n. Subsequently, data stored in NVM buffer 124 may be committed to NVMs 128a-n one block at a time. Thus, enhanced block utilization of NVMs 128a-n may be achieved, reducing the need for data management techniques such as garbage collection.

Memory controller 106 can use shared internal bus 126 to access NVMs 128a-n. In addition, memory controller 106 can use NVMs 128a-n to persistently store a variety of information, such as debug logs, instructions, and firmware that NVM package 104 uses to operate. Although only one shared internal bus 126 is depicted in NVM package 104, an NVM package can include more than one shared internal bus. Each internal bus can be connected to multiple (e.g., 2, 3, 4, 8, 32, etc.) memory dies as depicted with regard to NVM dies 112a-n. NVM dies 112a-n can be physically arranged in a variety of configurations, including a stacked configuration, and may be, according to some embodiments, integrated circuit ("IC") dies.

According to some embodiments, other system components of NVM package 104 (e.g., volatile memory 122, volatile memory buffer 123, and NVM buffer 124) may be electrically coupled to shared internal bus 126. In these and other embodiments, a bus controller (not shown) may be included within NVM package 104 to control communications between the system components coupled to shared internal bus 126.

Figure 2:
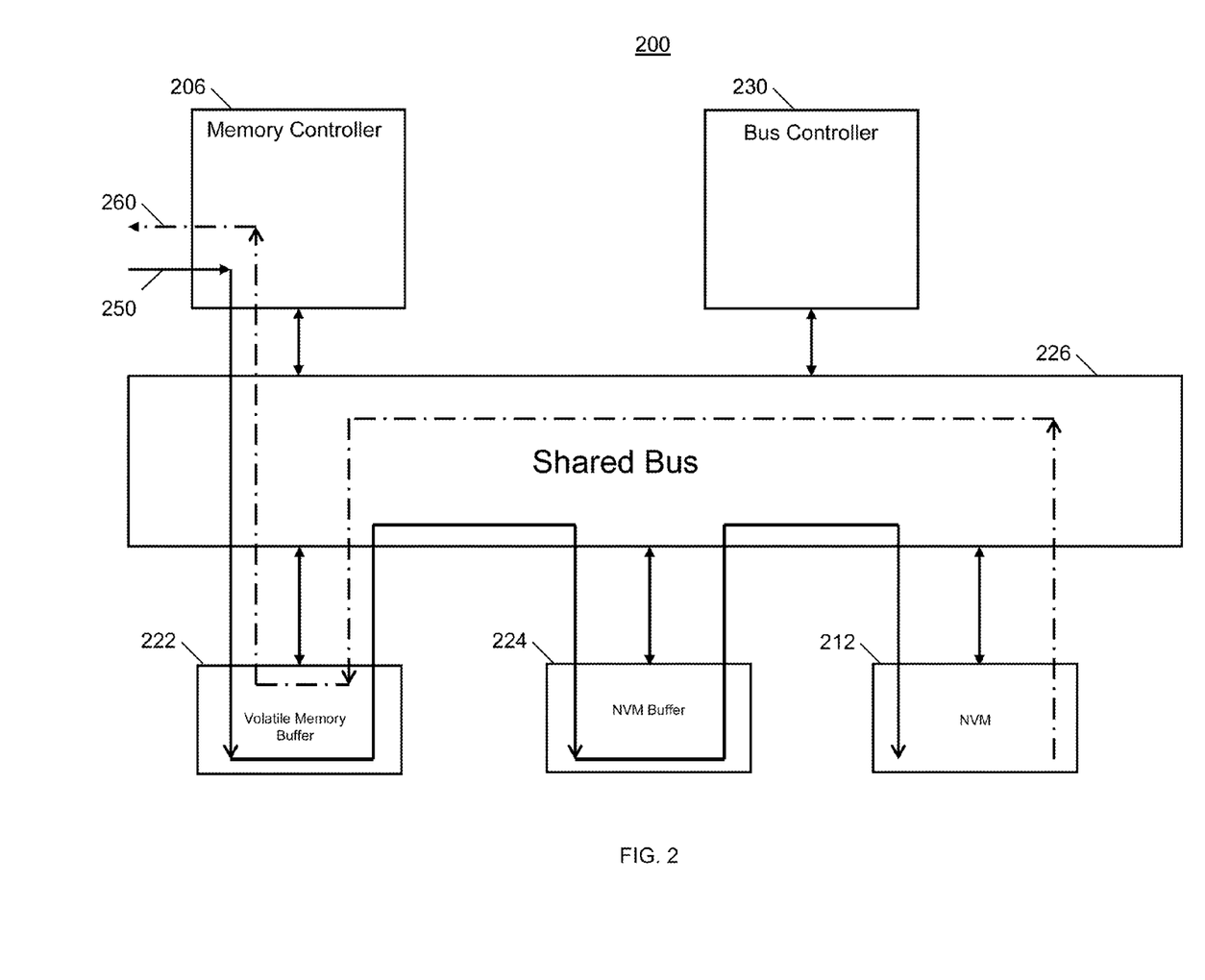
FIG. 2 is a diagram depicting an illustrative system for transferring data via heterogeneous data paths in accordance with various embodiments.

FIG. 2 is a diagram depicting an illustrative system 200 for transferring data via heterogeneous data paths in accordance with various embodiments. System 200 can include a memory controller 206, a volatile memory buffer 223, an NVM buffer 224, and an NVM 212, which may correspond to memory controller 106, volatile memory buffer 123, NVM buffer 124, and NVM dies 112a-n of FIG. 1, respectively. Memory controller 206, volatile memory buffer 223, NVM buffer 224, and NVM 212 may be communicatively coupled to each other over shared bus 226, which may correspond to shared internal bus 126 of FIG. 1. Communications over shared bus 226 may be controlled by bus controller 230. One skilled in the art may appreciate that individual communications paths between the various components may be substituted for shared bus 226.

Also depicted in FIG. 2 are heterogeneous data paths 250 and 260. Data path 250 can be a data path for writing data from a host device (e.g., host 102 of FIG. 1) to NVM 212. In some embodiments, data transferred via data path 250 may be received from the host device at memory controller 206 and then stored in volatile memory buffer 223. Although volatile memory buffer 223 is depicted as a discrete component, one skilled in the art will appreciate that volatile memory buffer 223 may be incorporated within a discrete volatile memory component (e.g., volatile memory 122 of FIG. 1) and/or within memory controller 206.

After the data is stored in volatile memory buffer 223, the data can then be transferred to NVM buffer 224 via data path 250. As discussed previously, data stored in NVM buffer 224 may be organized for optimal NVM block utilization prior to being programmed to NVM 212.

Data path 260 can be a data path for reading data from NVM 212. In some embodiments, memory controller 206 can receive a read command from the host device. Pursuant to the read command, data can be transferred via data path 260 from NVM 212 directly to volatile memory buffer 223 without first being stored in NVM buffer 224. Data can then be transferred from volatile memory buffer 223 to the host device via data path 260. According to some embodiments, data may be transferred from volatile memory buffer 223 to the host device via communications channels within memory controller 206.

Figure 3:
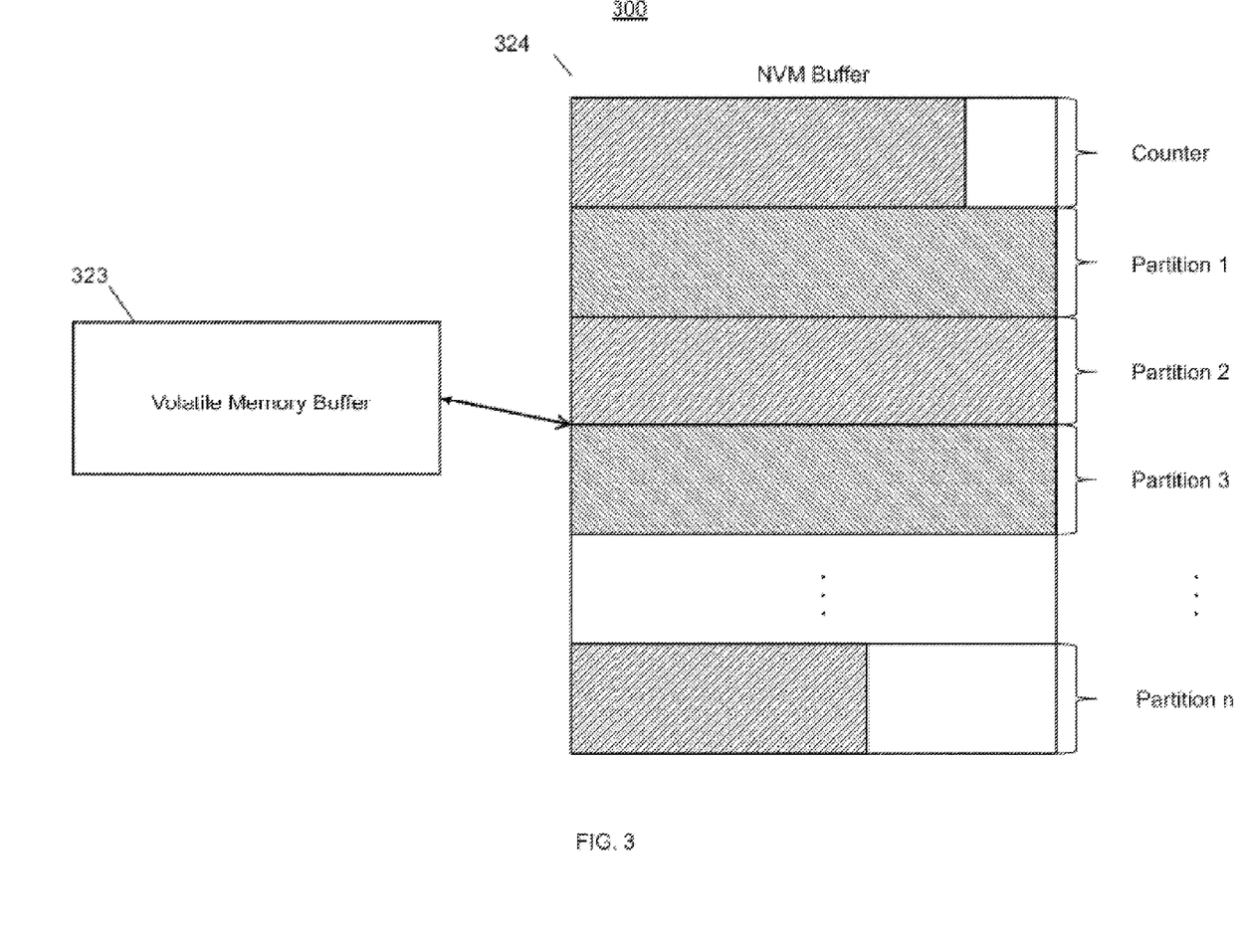
FIG. 3 is a diagram depicting an illustrative system for data organization in a nonvolatile memory buffer in accordance with various embodiments.

FIG. 3 is a diagram depicting an illustrative system 300 for data organization in a nonvolatile memory buffer in accordance with various embodiments. System 300 10 can include volatile memory buffer 323 and NVM buffer 324, which may correspond to volatile memory buffer 123 and NVM buffer 124 of FIG. 1, respectively. Data may be transferred from volatile memory buffer 323 to NVM buffer 324 via a write data path (e.g., data path 250 of 15 FIG. 2).

NVM buffer 324 may include a number of partitions (e.g., partitions 1-n), the size of which can correspond to the block size utilized in an NVM of the system (e.g., NVMs 128a-n of FIG. 1) coupled to NVM buffer 324. As one particular example, if each block of the NVM includes 128 pages of 4,096+128 bytes, NVM buffer 324 can be partitioned into segments of 512 KB. Data may be transferred from volatile memory buffer 323 to NVM buffer 324 such that each partition of NVM buffer 324 is as full as possible before proceeding to transfer data to the next partition.

Programming full blocks to the NVM from NVM buffer 324 can lead to better block utilization. Enhanced block utilization can reduce the need for memory management techniques such as garbage collection. Additionally, organizing data within NVM buffer 324 can reduce NVM program cycles and data fragmentation in the NVM.

According to some embodiments, NVM buffer 324 can store a counter that can keep track of the utilization of NVM buffer 324. The counter may be read by a memory controller (e.g., memory controller 106 of FIG. 1) of system 300 in order to determine when to program the data stored in NVM buffer 324 to the NVM. For example, the memory controller may wait until the counter in NVM buffer 324 indicates that at least a certain number or percentage of partitions of NVM buffer 324 are full (or as full as possible) before committing the data stored in those partitions to the NVM. In some embodiments, the counter can track utilization of NVM buffer 324 with any suitable level of granularity (e.g., by counting the number of page-sized portions of NVM buffer 324 utilized in each partition).

According to some embodiments, the number of partitions required to be full before data is programmed to the NVM may depend on the amount of data requested to be written to the NVM. For example, if a host device requests to program less data than would fill the entirety of NVM buffer 324 (e.g., partitions 1-n), the memory controller may wait until all of the data has been transferred to NVM buffer 324 before committing the data to the NVM. However, if the host device requests to program more data than would fill the entirety of NVM buffer 324, the memory controller may commit only one-half or one-third of the partitions at a time, thus keeping one-half or two-thirds of the partitions free to receive data from volatile memory buffer 323. Thus, data may be received at NVM buffer 324 from volatile memory buffer 323 and transferred from NVM buffer 324 to the NVM simultaneously to avoid bottlenecking.

In some embodiments, the memory controller may distinguish sensitive data from non-sensitive data in determining whether to write data to NVM buffer 324. For example, sensitive data, including file-system data or any other data that is deemed "sensitive" for any reason, can be transferred from volatile memory buffer 323 to NVM buffer 324 before being programmed to the NVM. On the other hand, data that is not sensitive may be transferred from volatile memory buffer 323 directly to the NVM.

Additional benefits of incorporating of NVM buffer 324 into system 300 may include allowing for the use of less reliable, and potentially cheaper, NVM as well as the ability to store data structure tables within NVM buffer 324, which can eliminate the need to load these tables from the NVM.

Figure 4:
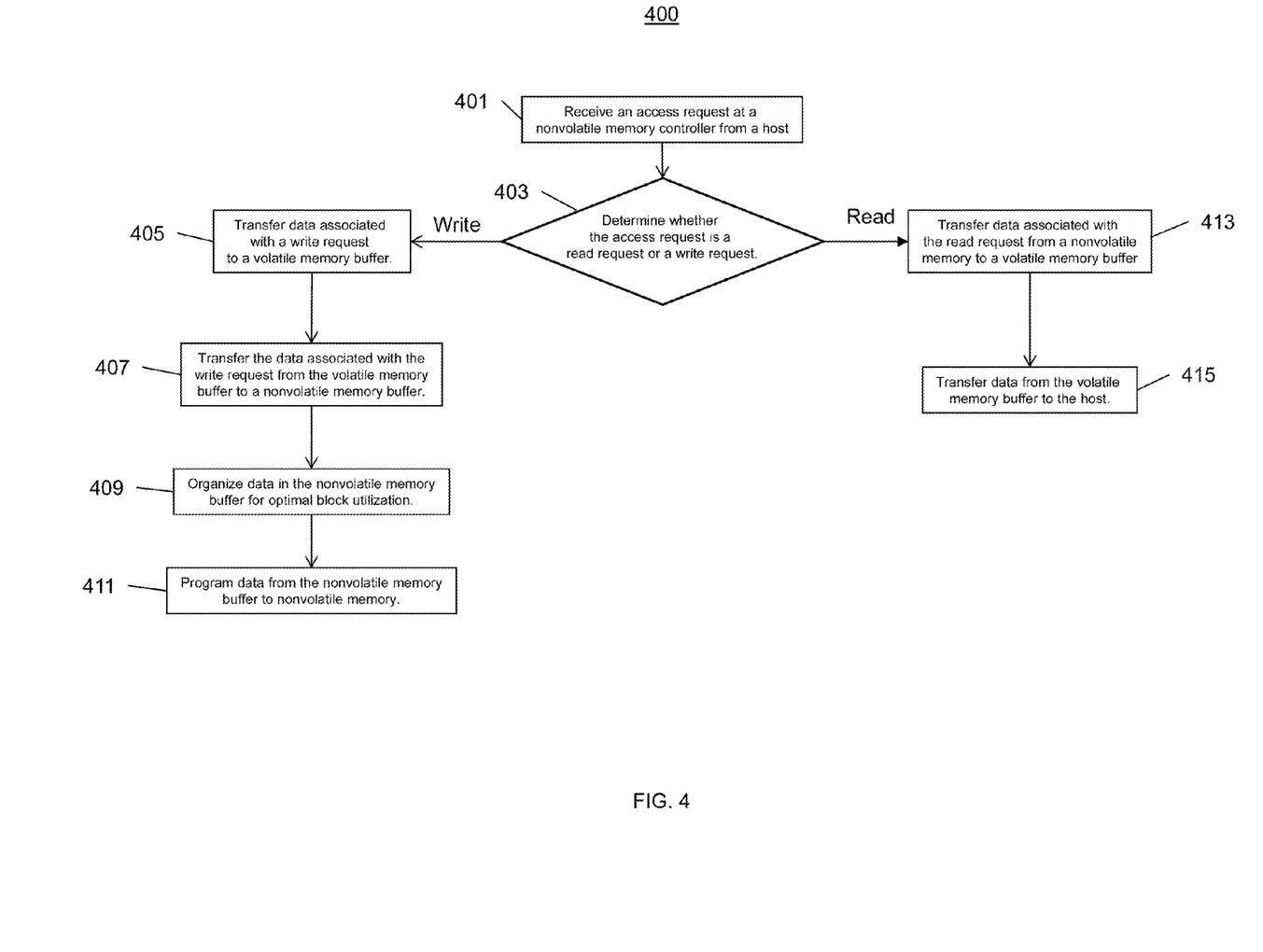
FIG. 4 is a flowchart of an illustrative process for transferring data via heterogeneous paths using tiered memories.

FIG. 4 is a flowchart of an illustrative process 400 for transferring data via heterogeneous paths using tiered memory solutions. At step 401, an access request may be received at a nonvolatile memory controller from a host device (e.g., memory controller 106 and host 102 of FIG. 1). The access request may be, for example, a program, read, or erase command.

At step 403, the memory controller can determine whether the access request is a read command or a program command. This determination may be made based upon a communications protocol used by the host and the memory controller. If the access request is determined to be a program command, process 400 may proceed to step 405, in which data associated with the program command can be transferred to a volatile memory buffer (e.g., volatile memory buffer 123 of FIG. 1). For example, the data associated with the program command may be transferred from the host device to the volatile memory via one or more communications channels (e.g., communications channel 116 of FIG. 1 and/or shared bus 226 of FIG. 2).

At step 407, the data associated with the write request can be transferred from the volatile memory buffer to an NVM buffer (e.g., NVM buffer 124 of FIG. 1). In some embodiments, the data associated with the write request may be transferred via a first data path (e.g., data path 250 of FIG. 2) for writing data to an NVM (e.g., NVMs 128a-n of FIG. 1). In some cases, the data path may include direct communications channels between the volatile memory buffer and the nonvolatile memory buffer. Alternatively, communications between the volatile memory buffer and the NVM buffer may be controlled by a bus controller (e.g., bus controller 230 of FIG. 2) over a shared bus (e.g., shared bus 226 of FIG. 2).

At step 409, the data in the NVM buffer may be organized for optimal block utilization. In some embodiments, the nonvolatile memory buffer may be segmented into partitions that are equal in size to the block size of the NVM. For example, the NVM buffer may include 64 partitions, each of which may be the same size as the block size of the NVM. In some embodiments, the memory controller may keep track of the NVM buffer to determine when to begin transferring data from the NVM buffer to the NVM. For example, the memory controller may refer to a counter stored in the NVM buffer to determine how much of the NVM buffer is currently being utilized.

The memory controller may determine when to begin transferring data from the NVM buffer to the NVM based upon utilization of the NVM buffer as well as the expected usage of the NVM. Expected NVM usage may be based upon, for example, a queue of access requests received at the memory controller. In particular, if the usage of the NVM is expected to be relatively light (e.g., the volatile memory buffer and/or the NVM buffer are large enough to store the data for the incoming access requests), the NVM buffer may be fully utilized to completely optimize block utilization. On the other hand, if NVM usage is expected to be relatively heavy, the memory controller may program data stored in the NVM buffer to the NVM before the NVM buffer is fully utilized. For example, the memory controller may begin to transfer data from the NVM buffer to the NVM when one-half or one-third of the partitions are full.

At step 411, the NVM may be programmed with the data stored in the NVM buffer. The data stored in the NVM buffer may be transferred for programming to the NVM via the first data path. In some embodiments, the data path may include direct communications channels between the NVM buffer and the NVM. Alternatively, communications between the NVM buffer and the NVM may be controlled by the bus controller over the shared bus.

Returning back to step 403, the access request is determined to be a read request, process 400 may proceed to step 413, in which data associated with the read request can be transferred from the NVM directly to the volatile memory buffer. For example, the data associated with the read request may be read from the NVM via a second data path (e.g., data path 260 of FIG. 2). That is, the data read from the NVM can be transferred directly to the volatile memory buffer without first being stored in the NVM buffer. In some embodiments, the data path may include direct communications channels between the volatile memory buffer and the NVM. Alternatively, communications between the NVM and the volatile memory buffer may be controlled by the bus controller over the shared bus.

At step 415, the data associated with the read request can be transferred from the volatile memory buffer to the host. The data associated with the read request may be transferred to the host over the second data path.

Figure 5:
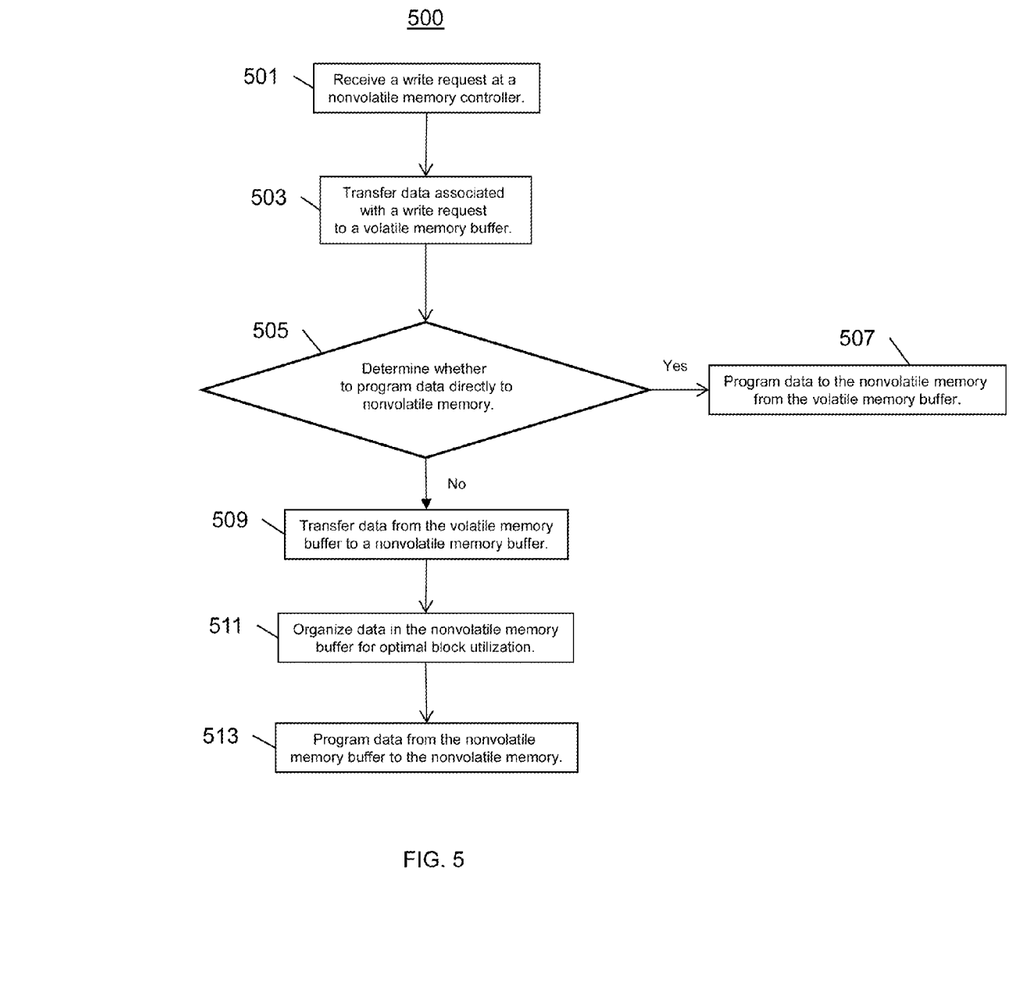
FIG. 5 is another flowchart of an illustrative process for transferring data via heterogeneous paths using tiered memories.

As discussed above, two separate data paths may be used for executing write requests. For example, a first write data path may include transferring data from a volatile memory buffer to a NVM buffer prior to programming the data to the NVM. Alternatively, a second write path may skip over the NVM buffer allowing the data to be programmed directly from the volatile memory buffer to the NVM. Accordingly, FIG. 5 is another flowchart of an illustrative process 500 for transferring data via heterogeneous paths using tiered memories. At step 501, a write request may be received at a nonvolatile memory controller (e.g., memory controller 106 of FIG. 1). At step 503, data associated with the write request can be transferred to a volatile memory buffer (e.g., volatile memory buffer 123 of FIG. 1). For example, the data associated with the write request may be transferred from the host device to the volatile memory via one or more communications channels (e.g., communications channel 116 of FIG. 1 and/or shared bus 226 of FIG. 2).

At step 505, the memory controller can determine whether to program the data directly to NVM (e.g., NVMs 128a-n of FIG. 1). The memory controller may make the determination to program the data directly to the NVM based upon any number of factors including, for example, a determination that an NVM buffer (e.g., NVM buffer 124 of FIG. 1) is full, power considerations, characteristics of the data associated with the write request, reliability of the NVM, and/or that the expected additional latency added by first storing the data within the NVM buffer is currently unacceptable.

If the memory controller determines that the data should be programmed directly to the NVM, the data may be programmed to the NVM at step 507. The data may be transferred directly via communications channels between the volatile memory buffer and the NVM. Alternatively, communications between the volatile memory buffer and the NVM may be controlled by the bus controller over the shared bus.

On the other hand, if the memory controller determines that the data should not be programmed directly to the NVM, the data may be transferred from the volatile memory buffer to the NVM buffer at step 509. Next, at step 511, data in the NVM buffer may be organized for optimal block utilization and then programmed from the NVM buffer to the NVM at step 513. Steps 509, 511, and 513 may generally correspond to steps 407, 409, and 411, discussed in more detail above with respect to FIG. 4.

It should be understood that processes 400 and 500 of FIGS. 4 and 5 are merely illustrative. Any of the steps may be removed, modified, or combined, and any additional steps may be added, without departing from the scope of the invention.

While there have been described heterogeneous data paths for systems having tiered memories, it is to be understood that many changes may be made therein without departing from the spirit and scope of the invention. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The described embodiments of the invention are presented for the purpose of illustration and not of limitation.

What is claimed is:

1. A method for transferring data within a nonvolatile memory system, the method comprising:

programming first data to a nonvolatile flash memory ("NVFM") over a first path, wherein the first data is associated with a write request received from a host device and is classified as sensitive data, and wherein the first path comprises:
  storing the first data in a volatile memory buffer;
  transferring the first data from the volatile memory buffer to a nonvolatile memory buffer that operates as a persistent random-access memory that preserves data stored therein in the event power to the system is lost, wherein inclusion of the nonvolatile memory buffer enables a size of the volatile memory buffer to be reduced while maintaining the same latency reduction that would be achieved had the volatile memory buffer not been reduced; and
  transferring the first data from the nonvolatile memory buffer to the NVFM;
reading second data from the NVFM over a second path, wherein the second data is associated with a read request received from the host device and the second path comprises:
  transferring the second data from the NVM directly to the volatile memory buffer; and
  transferring the second data from the volatile memory buffer to the host device; and
programming third data to the ("NVFM") over a third path, wherein the third data is associated with a write request received from the host device and is classified as non-sensitive data, and wherein the third path comprises:
  storing the third data in the volatile memory buffer; and
  transferring the third data directly from the volatile memory buffer to the NVFM, bypassing the nonvolatile memory buffer.

2. The method of claim 1, wherein the nonvolatile memory buffer comprises at least one of:
  magnetoresistive random-access memory ("MRAM");
  phase-change memory ("PCM"); and
  resistive random-access memory ("ReRAM").

3. The method of claim 1, wherein the nonvolatile memory buffer is configured to reorganize data received from the volatile memory buffer to improve block utilization of the NVFM.

4. The method of claim 3, wherein the nonvolatile memory buffer is configured to commit one block of data at a time to the NVFM.

5. The method of claim 3, wherein the nonvolatile memory buffer is configured to commit multiple blocks of data at a time to the NVFM.

6. The method of claim 3, wherein the nonvolatile memory buffer comprises at least one counter configured to track block utilization prior to the transferring the first data from the nonvolatile memory buffer to the NVFM.

7. A method for transferring data within a nonvolatile memory ("NVM") system, the method comprising:
  receiving an access request at an NVM controller;
  determining whether the access request is a read request or a write request;
  if the access request is a write request, determining whether the data associated with the write request is one of sensitive data and non-sensitive data
  based on the determining of the access request and the data determination of the write request, choosing one of a first path, a second path, and a third path for transferring data associated with the access request within the NVM system, wherein:
    the first path comprises temporarily storing the data in an NVM buffer prior to writing the data to an NVM, wherein the first path is selected when the data associated with the write request is sensitive data;
    the second path comprises transferring the data directly from the NVM to a volatile memory buffer such that the NVM buffer is bypassed, wherein the NVM buffer is a persistent random-access memory that preserves data stored therein in the event power to the system is lost, wherein inclusion of the NVM buffer enables a size of the volatile memory buffer to be reduced while maintaining the same latency reduction that would be achieved had the volatile memory buffer not been reduced; and
    the third path comprises transferring the data from the volatile memory buffer directly to the NVM, bypassing the NVM buffer, wherein the third path is selected when the data associated with the write request is non-sensitive data.

8. The method of claim 7, wherein the first path further comprises:
  temporarily storing the data in the volatile memory buffer prior to temporarily storing data in the nonvolatile memory buffer; and
  programming the data from the nonvolatile memory buffer to the NVM.

9. The method of claim 7, wherein the second path further comprises reading the data from the volatile memory buffer.

10. The method claim 7, wherein the nonvolatile memory buffer comprises at least one of:
  magnetoresistive random-access memory ("MRAM");
  phase-change memory ("PCM"); and
  resistive random-access memory.

11. The method of claim 7, wherein the volatile memory buffer comprises at least one of:
  dynamic random-access memory ("DRAM"); and
  static random-access memory ("SRAM").

* * * * *